(12) United States Patent
Brock et al.

(10) Patent No.: US 6,836,849 B2
(45) Date of Patent: Dec. 28, 2004

(54) METHOD AND APPARATUS FOR CONTROLLING POWER AND PERFORMANCE IN A MULTIPROCESSING SYSTEM ACCORDING TO CUSTOMER LEVEL OPERATIONAL REQUIREMENTS

(75) Inventors: Bishop Chapman Brock, Coupland, TX (US); Harm Peter Hofstee, Austin, TX (US); Mark A. Johnson, Austin, TX (US); Thomas Walter Keller, Jr., Austin, TX (US); Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 09/826,986

(22) Filed: Apr. 5, 2001

(65) Prior Publication Data

US 2002/0147932 A1 Oct. 10, 2002

(51) Int. Cl.[7] ................................................. G06F 1/26
(52) U.S. Cl. ....................... 713/310; 713/300; 713/320; 713/322; 713/323; 713/324; 713/340
(58) Field of Search ................................. 713/300, 320, 713/322, 323, 324, 340, 500, 502, 601, 310

(56) References Cited

U.S. PATENT DOCUMENTS

| | | | | |
|---|---|---|---|---|
| 5,484,012 A | * | 1/1996 | Hiratsuka | 165/247 |
| 5,502,838 A | * | 3/1996 | Kikinis | 713/501 |
| 5,752,011 A | | 5/1998 | Thomas et al. | 395/556 |
| 5,798,918 A | | 8/1998 | Georgiou et al. | 364/148 |
| 5,881,298 A | * | 3/1999 | Cathey | 713/324 |
| 5,906,315 A | * | 5/1999 | Lewis et al. | 236/49.3 |
| 5,940,785 A | | 8/1999 | Georgiou et al. | 702/132 |
| 6,000,036 A | * | 12/1999 | Durham et al. | 713/320 |
| 6,029,251 A | | 2/2000 | Williams et al. | 713/501 |
| 6,052,268 A | | 4/2000 | Thomas | 361/103 |
| 6,119,241 A | * | 9/2000 | Michail et al. | 713/322 |
| 6,157,989 A | * | 12/2000 | Collins et al. | 711/151 |
| 6,397,343 B1 | * | 5/2002 | Williams et al. | 713/501 |
| 6,560,658 B2 | * | 5/2003 | Singer et al. | 710/5 |
| 6,639,883 B1 | * | 10/2003 | Vladimir | 369/47.44 |
| 6,718,474 B1 | * | 4/2004 | Somers et al. | 713/322 |

OTHER PUBLICATIONS

"Automatic Regulation of Processor Frequency for Personal Computers," *IBM Technical Disclosure Bulletin*, vol. 37, No. 09, Sep. 1994, pp. 325–328.

* cited by examiner

*Primary Examiner*—Lynne H. Browne
*Assistant Examiner*—James K. Trujillo
(74) *Attorney, Agent, or Firm*—Richard F. Frankeny; Winstead Sechrest & Minick P.C.; Casimer K. Salys

(57) ABSTRACT

A method and controller for managing power and performance of a multiprocessor (MP) system is described. The controller receives sensor data corresponding to physical parameters within the MP system. The controller also receives quality of service and policy parameters corresponding to the MP system. The quality of service parameters define commitments to customers for utilization of the MP system. The policy parameters correspond to operation limits on inputs and outputs of the MP system. The operation input limits relate to the cost and availability of power or individual processor availability. The operation output limits relate to the amount of heat, acoustic noise levels, EMC levels, etc. that the individual or group of processors in the MP system are allowed to generate in a particular environment. A controller receives the physical parameters, the quality of service parameters and policy parameters and determines performance goals for the MP system and processors within the MP system. Then controller generates controls and applies them to individual processors to achieve the performance goals.

33 Claims, 5 Drawing Sheets

METHOD AND APPARATUS FOR CONTROLLING POWER AND PERFORMANCE IN A MULTIPROCESSING SYSTEM ACCORDING TO CUSTOMER LEVEL OPERATIONAL REQUIREMENTS

TECHNICAL FIELD

The present invention relates, in general, to methods and apparatus for managing power usage in a computer system with multiple processors.

BACKGROUND INFORMATION

A large number of computer systems today contain many processing units that may be employed on one task or many different tasks. The advent of the Internet has led to large "server farms" where buildings house a very large number of processing units that are partitioned into racks of processing units (e.g., servers) where each rack has power distribution and cooling distribution capabilities. The processing units in the racks may be self-contained with fans and their own power supplies. Typically, more self-contained processing units may be placed in a rack than the corresponding cooling system for the rack can cool if all processing units were operating such that they dissipated maximum power. The building that houses these many racks of processing systems may also house more racks than the corresponding building cooling system can cool if all racks were operating at some high level of power dissipation even though each rack may be within its cooling limits. The cooling limit of the building may depend on the outside weather and the status of the building cooling system.

Within the racks, each self-contained processing unit (e.g., server) may have one or more printed circuit boards that may include multiple very large scale integrated circuits (VLSI) as the processing units. The processing units in a rack may themselves have thermal limits or other limits depending on how intensively the multiprocessor VLSI chips are utilized. In fact, the individual VLSI chips may also have a marked difference in temperatures if they are utilized differently for particular tasks.

Realizing that managing power within a VLSI chip may be a problem, chip designers have been designing capabilities into VLSI circuits that allow the power dissipated in the chip to be managed. The power dissipation in a VLSI chip employing complementary metal oxide semiconductor (CMOS) circuits is proportional to the square of the voltage excursions on the logic circuits and linearly proportional to the frequency at which the logic circuits operate. Some VLSI chips have been designed to allow the VLSI power supply voltage and the clock frequency to be modified depending on the task to be performed by the VLSI chip and its operating temperature. Many VLSI processor chips incorporate chip temperature sensing as part of the overall chip design to allow chip temperature to be easily monitored. Some prior art processors employ algorithms that allow the chip's temperature to be used in an overall strategy for chip power management where both the chip voltage and clock frequency are simultaneously modified in a prescribed manner. These VLSI processors monitor instruction execution and determine an optimum chip clock frequency and power supply voltage to use to allow the VLSI processor to execute a given instruction set more efficiently than alternate designs.

Recent advances in VLSI processor chips have allowed VLSI chips to have multiple processors on one chip, further increasing the possible VLSI chip power dissipation. These multiple processors may be employed in a wide range of applications where processor utilization may require power management to conserve VLSI chip power or prevent a VLSI chip failure.

When "server farms" employ servers with VLSI processor chips where groups of chips or single chips may implement multiple processors, power and performance management at the chip, server, rack and building level, required to meet the needs of diverse users, becomes more complex. The building housing the server farm may have severe power density issues which do not allow all its racks of servers to be operated at their maximum performance. While actions of prior art power management may improve the power density of the building, the needs of the users would not necessarily be met with the best cost versus performance. Many of the power management issues facing large server farms, single servers employing multiple processors in a business environment, and even VLSI processor chips with multiple processors, require consideration of other parameters besides the temperature of VLSI chips or system components.

There is, therefore, a need for a power and performance management method and control system that may be applied to individual multiprocessor VLSI chips, multiprocessing systems, and buildings housing a large number of multiprocessing systems where physical as well as operational parameters may be employed to optimize the cost, performance, quality of service, and environmental aspects of data processing.

SUMMARY OF THE INVENTION

A multiprocessor (MP) system management controller receives inputs defining the tasks to be performed as well as policy parameters and quality of service parameters. Processing is allocated to processors in the MP system based on the tasks, quality of service and policy parameters. A determination is made as to workload distribution by allocating processors to work on specific tasks. MP system parameters, including voltages, clock frequencies, cooling outputs, and setting processors units into various types of sleep modes. Various sensors measure the system local and global output responses to these parameter variations. These output responses are compared to the power and performance goals set by the MP system management controller to meet cost of power, quality of service, thermal, and various other system performance goals.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
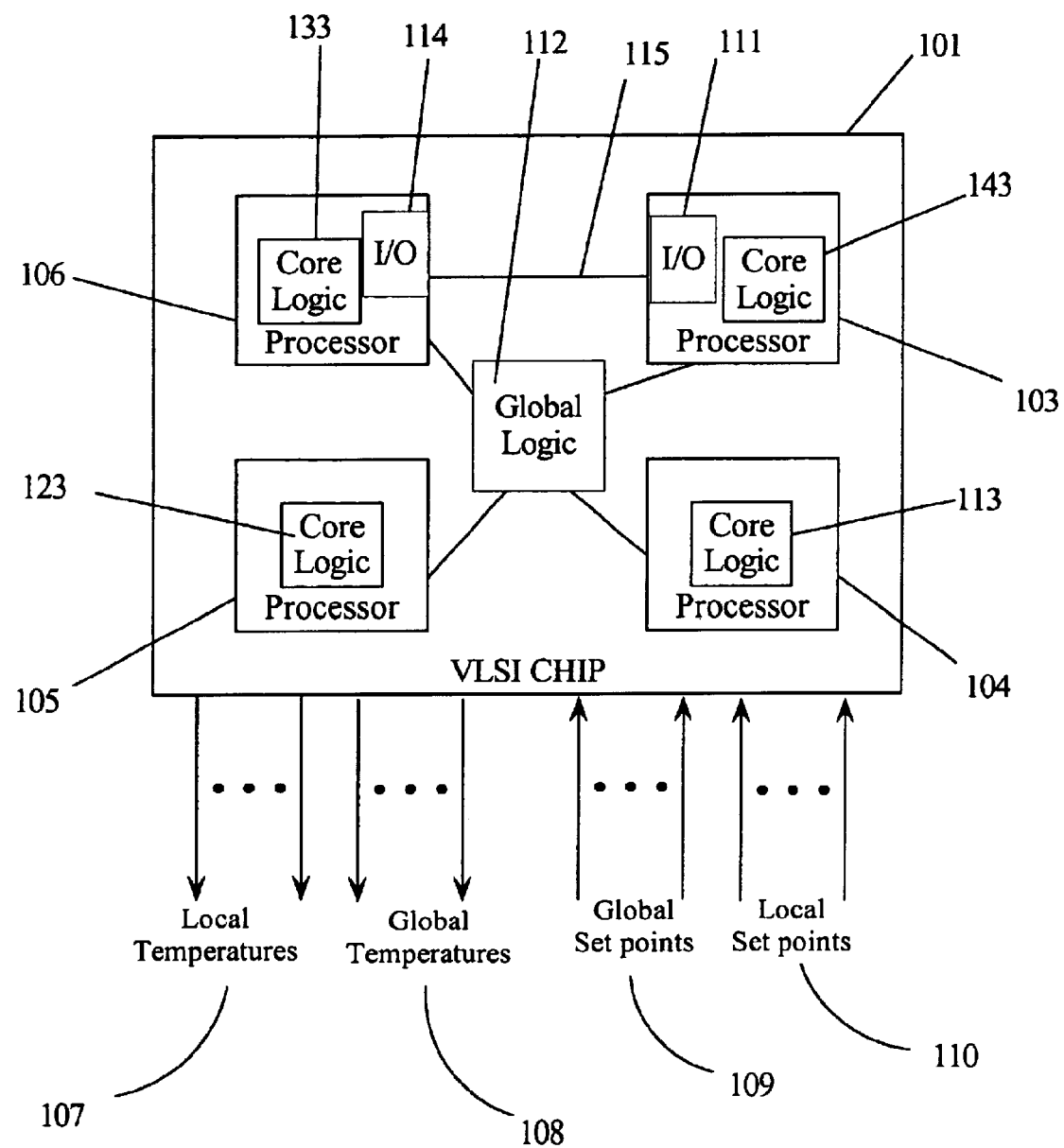
FIG. 1 is a block diagram of a very large scale integrated circuit (VLSI) chip which has multiple processor units and corresponding sense outputs and control inputs.

In the following description, numerous specific details are set forth such as specific voltages or frequencies, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Modern computer systems are being configured as multiprocessing units at all levels of the system implementation. Individual VLSI processor chips may themselves have more than one complete processor unit. Since most VLSI processor chips employ complementary metal oxide semiconductor (CMOS), the performance, power dissipation and in some cases the electromagnetic radiation from the chip is dependent on the VLSI logic voltage swing and the frequency of the clock. For CMOS circuits, the VLSI chip power dissipation varies as the square of the voltage and linearly with the clock frequency. While a chip may be capable of executing instructions up to a maximum clock frequency, the particular maximum clock frequency will be dependent on the power supply voltage used for the VLSI chip. Increasing the VLSI chip power supply voltage allows the chip to run faster, however available cooling may limit the operation of the VLSI chip to insure a maximum operating temperature is not exceeded. Modern VLSI chips have capabilities to allow the VLSI chip voltage and clock frequency to be varied to maintain a desired chip maximum temperature. On chip temperature sensors are incorporated to allow chip temperature control to be more easily implemented. It is possible for a VLSI chip with multiple processing units to have each processing unit operating on a different task. The VLSI processor chips also allow the core processing logic to operate at a different voltage and frequency from the input/output (I/O) driver and receiver logic. It is possible therefore for a VLSI chip with multiple processing units to accomplish a task with a given performance by different means. For example, one of the multiple processing units could be operated at maximum frequency and voltage to accomplish the task or more than one processing unit could operate at reduced frequency and voltage to also accomplish the task. Managing performance and power for VLSI processor chips may be accomplished by adjusting the frequency and voltage without suspending processing if the order of adjustment is controlled depending on whether performance is increasing or decreasing. When increasing performance, the voltage must be increased before the frequency is increased, since a higher frequency clock requires a higher supply voltage. Likewise, when reducing performance, the clock frequency must be reduced first to prevent a high frequency clock from operating with a lower supply voltage.

A multiple processor VLSI chip may be viewed as having a global performance, the sum of the performance of all its on chip processor units and a local performance, the performance of the individual on chip processor units. Different strategies are possible in managing the power and performance of a single multiprocessor VLSI chip provided that the clock and voltage of the core logic in each processor unit (local conditions) may be varied independently while their I/O communication logic has a common frequency and voltage (global conditions). If one is using only a single multiprocessor VLSI chip, it is hard to envision a need for power and performance management other than to control the individual processor temperature or a temperature for the entire chip. However, when single or multiprocessor VLSI chips are integrated to make large, cluster multiprocessor systems, then power and performance may be managed for reasons other than simple temperature control. Cluster systems simply means two or more systems that work together. It generally refers to multiple computer systems that are linked together in order to handle variable workloads or to provide continued operation in the event one fails. Each computer may be a multiprocessor system itself. For example, a cluster of four computers, each with four CPUs, would provide a total of 16 CPUs processing simultaneously. While the reasons for power and performance management may be different in larger, cluster multiprocessor systems, one of the fundamental control mechanisms, modifying clock frequency and logic supply voltage, remains the same.

A stand-alone server may employ several multiprocessor VLSI chips which are interconnected on a printed circuit board. The server may be self-contained and have its own power supply and cooling system (e.g., a fan for forced air cooling). This type of server would also have global and local temperature limits. There may be a requirement to keep the server box temperature within a certain range and a requirement to keep the temperature of each individual VLSI processor chip (e.g., junction temperature) below a maximum value. Depending on the environment in which the stand-alone server unit was placed, the limits may need to be altered. For example, if the server was in a high ambient temperature environment, it may not be possible to run all the multiprocessor VLSI chips at their maximum clock frequency without exceeding either a local or global temperature limit. If the ambient inlet air temperature of the server was measured along with the chip temperatures of the VLSI chips and the temperature within the server box, then actions may be taken to keep the server operating at some reduced performance by adjusting individual processor unit frequency and voltage or by globally adjusting the frequency and voltage of all the multiprocessor VLSI chips within the server. In this case, temperature inputs other than the individual VLSI chip temperatures are used to determine power and performance goals for the individual multiprocessor VLSI chips.

In the single server example, other "outputs" of the server are indirectly affected by performance and power. The electromagnetic (radiation or conduction) compatibility (EMC) of an individual server is affected by frequency and power of its individual processors. EMC is a broad distinction that defines components that may be used together without electromagnetic interference. This may refer a component or system that generates electromagnetic interference (EMI) or a component or system susceptibility to EMI. Likewise, if the server is dissipating considerable power and its cooling fan has to be run at a higher speed, it may emit more acoustic noise. If the server was placed in an environment where a premium was placed on reducing these "outputs", then the frequency and voltage of the processor units could be reduced to meet a set goal for acoustic noise and EMC. If the server was used in an application where a premium was placed on performance and acoustic noise was not important, then the cooling fan speed could be increased to allow all the processor units to operate at their maximum speed.

In one common system configuration, multiple stand-alone servers are rack mounted to create a cluster system. The system rack is used to mount the processor units (e.g., servers) as well as to provide input power distribution to all the stand-alone servers. The system rack may also have a central cooling unit in the form of ducted conditioned air or a separate rack fan. Again this group of servers may be viewed as having global as well as local power and performance limits. As with the individual servers, the rack of servers may have various outputs, operational performances, temperatures, acoustic noise, EMC, etc., that may be affected by performance and power. To manage the performance and power of the rack of servers, a controller may use various measured physical parameters along with received policy and quality of service parameters to determine a set of global and local set points for the processing units within the rack of servers. Each server may have global set points (e.g., box temperature) and local set points (e.g., frequency and voltages for each multiprocessor VLSI chip) which are modified by the controller to meet power and performance management goals. The controller may have limited actions that it may execute to achieve a particular power and performance management goal such as, modify clock frequencies, modify chip supply voltages, and adjust the speed of various cooling fans. The controller may also completely suspend the operation of a processing unit.

Large cluster MP systems may employ many racks of servers in a building which may be used for managing Internet web sites. In these cluster MP systems, the power density in the building is very high and the energy costs required to maintain all the processors in an operational state also becomes an issue. In this application, certain customers pay for a quality of service to guarantee which may include assurance that their application has a zero down time, guaranteed network bandwidth or guaranteed performance. Other customers may be inconvenienced by a quality of service parameter, but are not willing to pay for the same level of service. If the main power grid fails, the large cluster MP system providers may have backup power. Backup power may only supply a limited amount of building power necessitating the need for a method of shutting down or reducing the power and performance of processing units within the building. The large cluster MP systems add cost of power and availability of power into the equation for performance and power management for MP systems.

Embodiments of the present invention teach a common method of performance and power management which may be applied in different MP system environments. Various sensor data is used to measure physical parameters, and these physical parameters are combined with policy and quality of service parameters to generate global and local actions for the various processor units in the multiprocessor environment. These actions include but are not limited to modifying the clock frequency and supply voltage of core logic in individual processor units on a multiprocessor VLSI chip, modifying the global frequency and supply voltage of I/O logic circuits, adjusting local cooling fan speed (e.g., added cooling fan 322) or active cooling devices (e.g., thermo-electric cooler 323) on individual VLSI chips, adjusting cooling fans on system level processing units (e.g., servers) with cooling fan 321), adjusting the cooling fans and air conditioning for multiple, stand-alone processing units (e.g., racks of servers with cooling system 324) and suspending operation (various modes of sleep) of individual multiprocessor VLSI chips, stand-alone MP systems, or MP system clusters. A sleep mode (no clocks and hold state), are adjusted to control a number of system local and global outputs. A sleep mode also may refer to other various types of controlled operational slowdown. For example, they may include idle (no data inputs, clock running and power applied), doze (reduced clock rate, holding state) and deep sleep (no power applied).

Refer now to the drawings wherein depicted elements are not necessarily shown to scale and wherein like or similar elements are designated by the same reference numeral through the several views.

FIG. 1 is an illustration of a multiprocessor VLSI chip 101 according to embodiments of the present invention. VLSI chip 101 has processors 103 through 106. Each of the processors has core logic (e.g., core logic 113). The exemplary core logic 113 is a group of logic circuits that perform the computation operations for the processor. Since the core logic (113, 123, 133, and 143) for a given processor 103 through 106 do not directly exchange information, their supply voltages and clock frequencies may be somewhat independent. This allows on-chip or off-chip regulators to supply different voltages to each core logic and allows the regulators to be adjusted based on local set point inputs 110. Communication between the processors 102, 104, 105 and 106 is accomplished by I/O circuits (e.g., 111 and 114) either directly (line 115) or indirectly through global I/O logic (e.g., 112). The exemplary I/O circuits 111, 112 and 114 would have a separate and common (global) clock frequency and supply voltage from core logic 113, 123, 133, and 143. An adjustment in a global set point would be used to change the clock frequency and supply voltage concurrently for I/O circuits 111, 112 and 114.

Phase locked loop (PLL) circuits may be used on multi-processor VLSI chips to create clock frequencies locked to a reference clock. A frequency divider circuit (e.g., counter) is used to modify the output of a PLL circuit while maintaining the lock to a reference clock. In this manner, different divider values may be inputted (local set points 110) to change the clock frequency of a processor 103, 104, 105 and 106. Outputs 107 are local temperature sensor outputs from measuring the temperature of the individual processors 103 through 106, while global output 108 is a temperature sensor output from a temperature sensor in a more central location of the VLSI chip 101 measuring an overall average chip temperature (global parameter).

Figure 2:
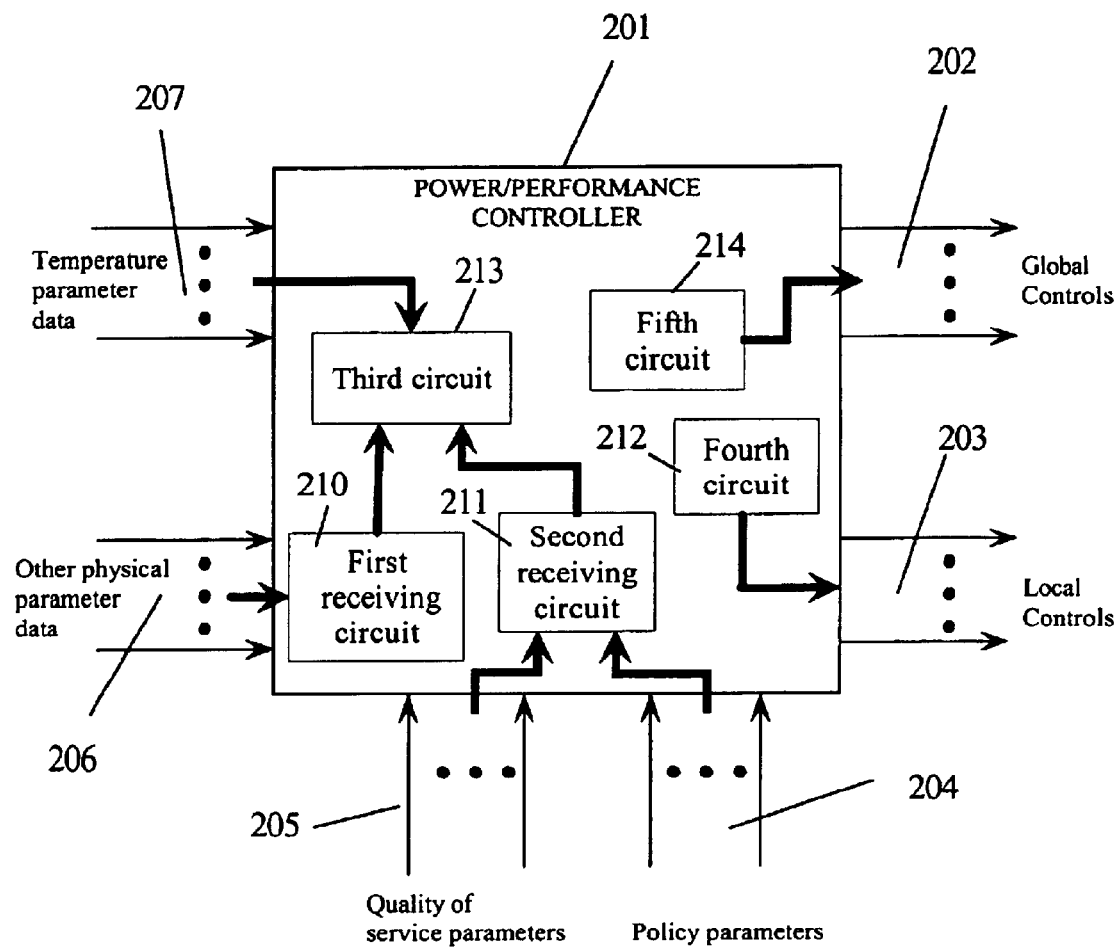
FIG. 2 is a block diagram of a power and performance management controller according to embodiments of the present invention.

FIG. 2 is a block diagram of power/performance controller 201. The description of power/performance controller 201 is found on page 15, line 7 through page 16, line 9. "FIG. 2 is a block diagram of a power/performance controller 201 according to embodiments of the present invention. Controller 201 maybe either a state machine or a programmed controller executing a set of software instructions. Controller 201 receives physical parameters (outputs of various temperature sensors) 207 or other physical parameters 206 in first and second receiving circuits 210 and 211 respectively. Other physical parameters 206 may include, but are not limited to, acoustic noise levels, vibration levels, EMC noise levels, etc. Controller 201 also receives quality of service parameters 205. Quality of service parameters 205 may be parameters identifying guaranteed customer accessibility to processors, guaranteed bandwidth of processing, etc. Policy parameters 204 are values that define the cost of power, the availability of power, acceptable EMC levels, acoustic noise levels, etc. Logic or program instructions within controller 201 receive these parameters (204 through 207) and are configured to determine using third circuit 213 to sets of global and local controls 202 and 203, respectively. For example, all or a portion of parameter data 207 may include outputs 107 and 108 from multiprocessor VLSI chip 101. These controls are used to set using a fifth circuit 214 the various processors (e.g., 103, 104, 105, and 106) at power and performance levels by adjusting their supply voltages, clock frequencies, and cooling. The controls 202 and 203 may include signals that allow individual processors to be set to an operational or sleep mode. Embodiments of the present invention may implement controller 201 as with certain distributed functions. Controller 201 may issue some signals using a fourth circuit 212 to set an MP system to a certain global power level and additional control circuits in the MP system may determine how the power level is distributed between the individual processors in the MP system to achieve the global goal and global MP system performance goals. For example, set points 109 and 110 may include one or more of controls 202 and 203.

Figure 3:
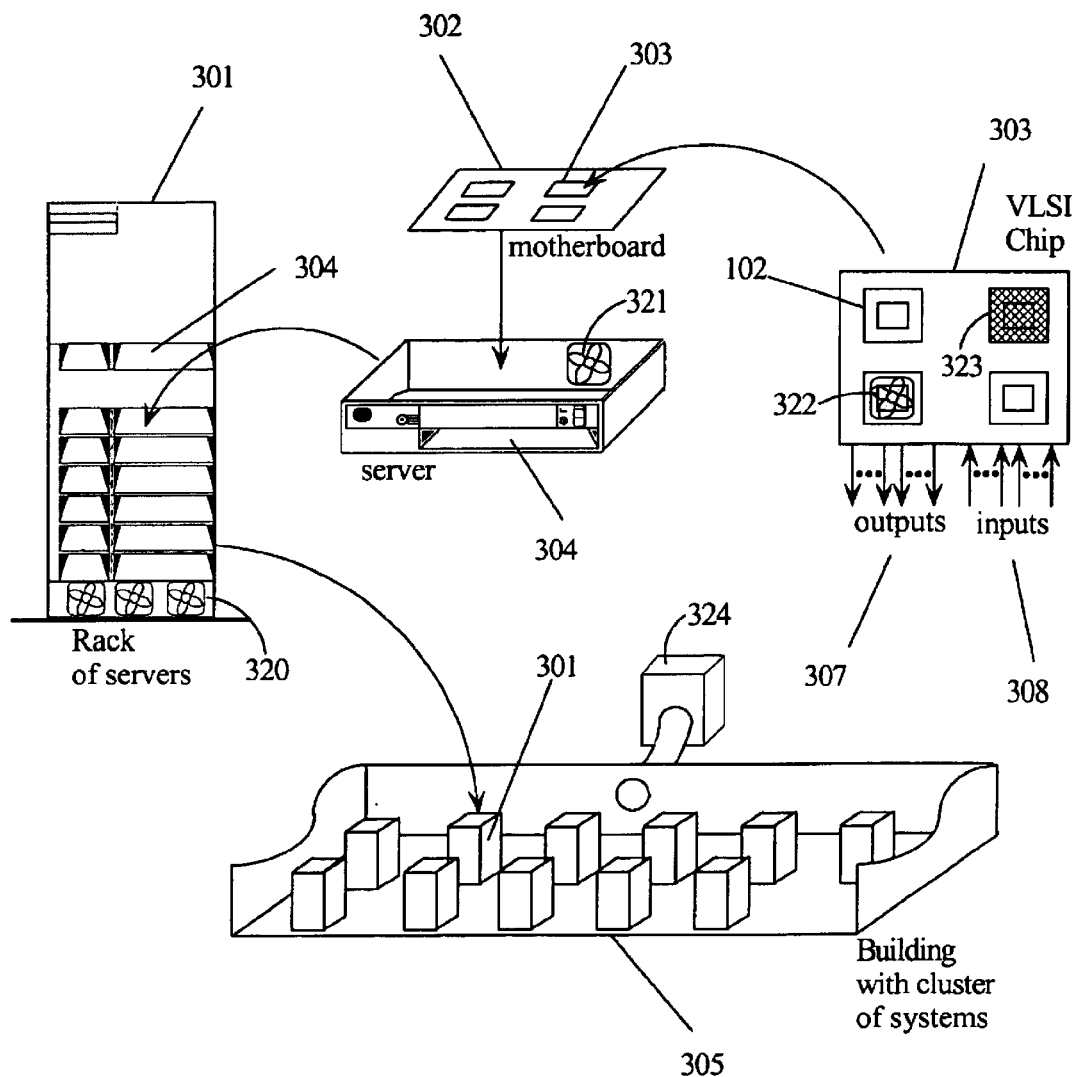
FIG. 3 is a block diagram illustrating the hierarchy of processing units according to embodiments of the present invention.

FIG. 3 is a block diagram illustrating the hierarchy and similarity of the various levels of multiprocessor systems. Multiprocessor VLSI chip 303 has inputs 308 and outputs 307 for controlling global and local chip parameters (e.g., temperatures, clock frequencies, and supply voltages). A local cooling fan 322 and solid state cooling device 323 are shown on individual processor circuits on VLSI chip 303. Several multiprocessor VLSI chips 303 are coupled on a printed circuit board (PCB) 302 and become part of a self-contained multiprocessor system (MS) 304 with cooling fan 321 (e.g., a server). MS 304 also has global and local parameters and controls. MS 304 has a total (global) performance which is the summation of the performances of the individual processors on PCB 302. MS 304 also has a global temperature (e.g., air temperature inside the box). MS 304 also has local parameters associated with the individual performance of its various multiprocessor VLSI chips 303 and the individual processors on these chips. The temperatures of the individual VLSI chips 303 may be thought of as local to MS 304. Rack 301 has cooling fans 320 and may house many MS 304 units and likewise outputs local and global parameters (e.g., 206 and 207) which may be monitored by controller 201. Rack 301 may also receive local and global controls (e.g., 202 and 203) from controller 201. Cluster system 305 may house many racks 301 and has a central cooling system 324. Cluster system 305, similarly, receives local and global controls (e.g., 202 and 203) and outputs local and global parameters (e.g., 206 and 207).

The particular parameters received by controller 201 vary depending on which hierarchical multiprocessor units generate the parameters. If controller 201 was used with only one rack 301, one may not be concerned with a cost of energy parameter. Likewise if controller 201 was used with a single MS 304 unit, acoustic noise levels may not be important as a parameter. However, embodiments of the present invention use a consistent strategy for power and performance management so that large cluster systems 305 may be controlled in the same way as a smaller multiprocessor system (e.g., MS 304). The only change is in the particular input parameters required and the number of local and global controls needed.

Figure 4:
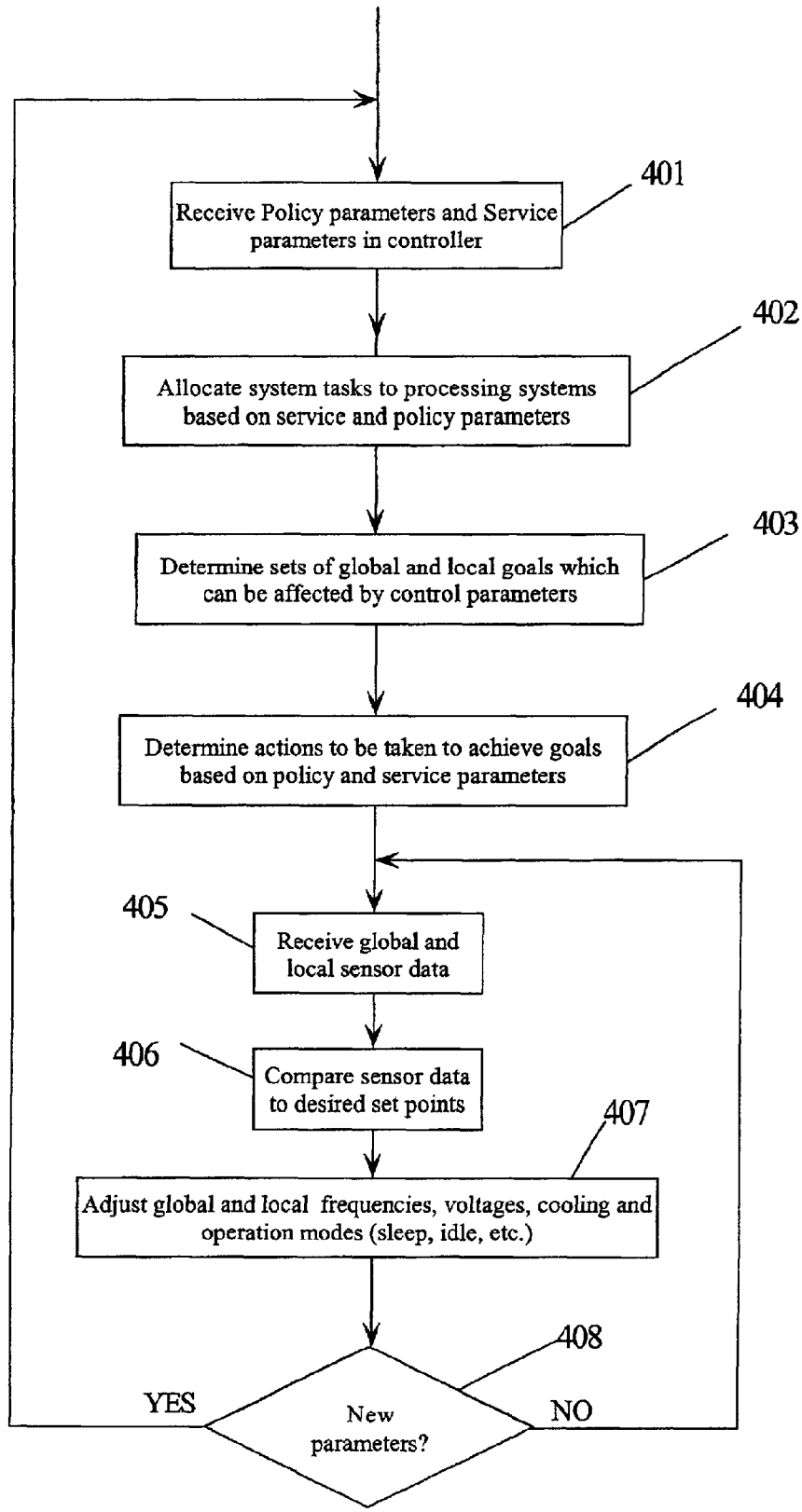
FIG. 4 is a flow diagram of method steps according to embodiments of the present invention.

FIG. 4 is a flow diagram of method steps according to an embodiment of the present invention. In step 401, Policy parameters 204 and Service parameters 205 are received by controller 201. In step 402, controller 201 allocates tasks to processors in a multiprocessor system (e.g., VLSI chip 101, MS 304, rack 301 or cluster system 305). In step 403, controller 201 determines sets of global and local goals which may be affected by global controls 202 and local controls 203 it generates. In step 404, controller 201 determines, with either its program of instructions or its state logic, actions to be taken to achieve the local and global goals based on Policy and Quality of service parameters. In step 405, controller 201 receives physical sensor parameters 206 and 207. In step 406, the sensor parameters 206 and 207 are compared with desired set points calculated or received by controller 201. In step 407, controller 201 outputs global controls 202 and local controls 203 to adjust global and local frequencies, voltages, cooling and operation interrupts. In step 408, a test is done to determine if new Quality of service parameters 205 or Policy parameters 206 have been indicated. If the result of the test in step 408 is NO, then step 405 is executed receiving new sensor physical parameters and steps 405, 406 and 407 are repeated until new parameters are indicated in step 408. If new parameters have been indicated in step 408, then a branch to step 401 is executed where the new Quality of service parameters 205 or Policy parameters 206 are received by controller 201 and the steps of method 400 repeat. The assumption in FIG. 4 is that the process continues as long as the controller 201 is operational.

Figure 5:
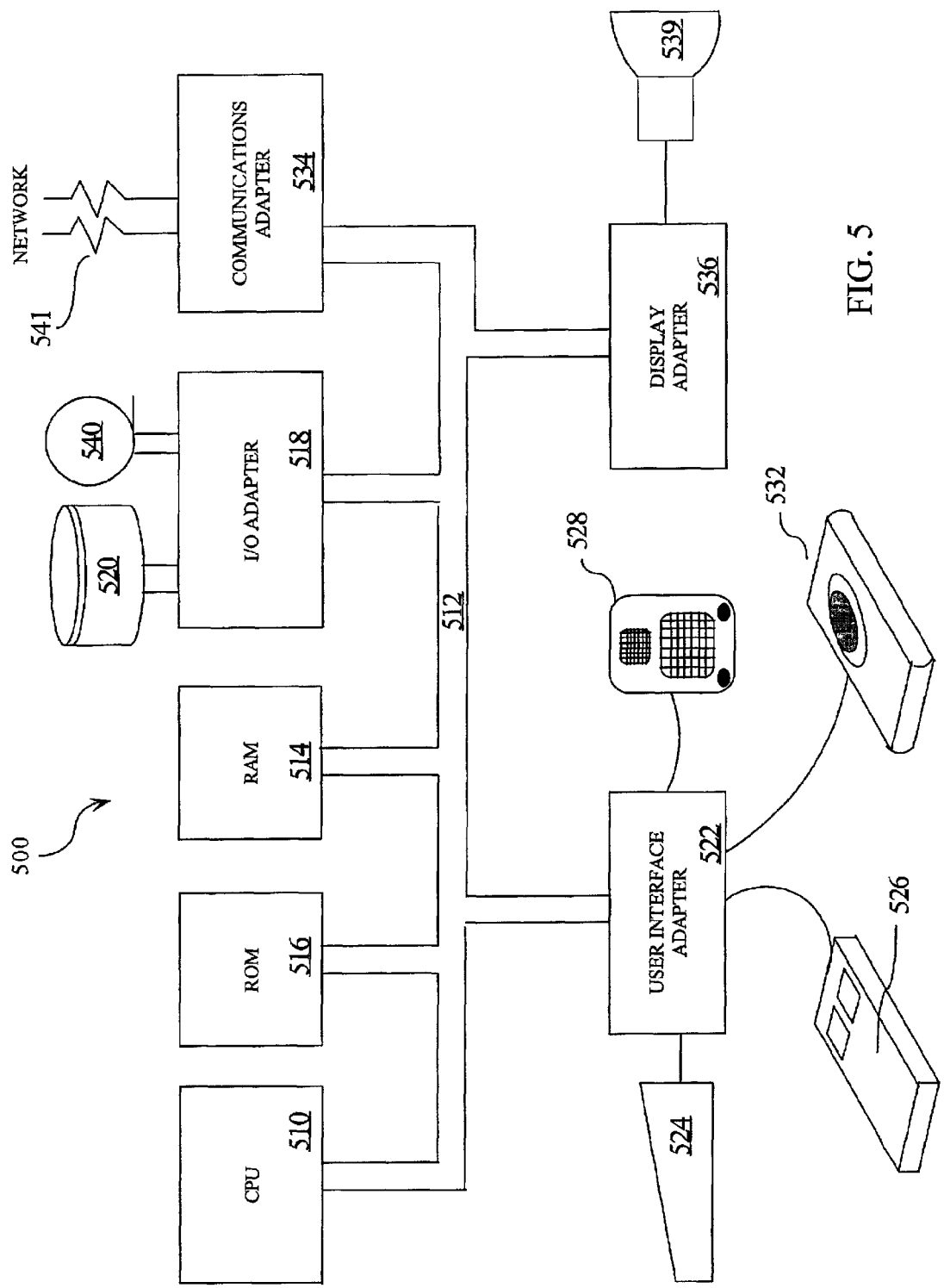
FIG. 5 is a block diagram of a data processing system operable to execute software code implementing the method steps according to embodiments of the present invention.

FIG. 5 is a high level functional block diagram of a representative data processing system 500 suitable for practicing the principles of the present invention. Data processing system 500, includes a central processing system (CPU) 510 operating in conjunction with a system bus 512. System bus 512 operates in accordance with a standard bus protocol, such that as the ISA protocol, compatible with CPU 510. CPU 510 operates in conjunction with read-only memory (ROM) 516 and random access memory (RAM) 514. Among other things, ROM 516 supports the Basic Input Output System (BIOS). RAM 514 includes, DRAM (Dynamic Random Access Memory) system memory and SRAM (Static Random Access Memory) external cache. I/O Adapter 518 allows for an interconnection between the devices on system bus 512 and external peripherals, such as mass storage devices (e.g., a hard drive, floppy drive or CD/ROM drive), or a printer 540. A peripheral device 520 is, for example, coupled to a peripheral control interface (PCI) bus, and I/O adapter 518 therefore may be a PCI bus bridge. User interface adapter 522 couples various user input devices, such as a keyboard 524, mouse 526, touch pad 532 or speaker 528 to the processing devices on bus 512. Display adapter 536 supports a display 539 for acquiring touch data according to embodiments of the present invention. Display 539 which may be, for example, a cathode ray tube (CRT), liquid crystal display (LCD) or similar conventional display units. Display adapter 536 may include among other things a conventional display controller and frame buffer memory. Data processing system 500 may be selectively coupled to a computer or telecommunications network 541 through communications adapter 534. Communications adapter 534 may include, for example, a modem for connection to a telecom network and/or hardware and software for connecting to a computer network such as a local area network (LAN) or a wide area network (WAN). CPU 510 may be a multiprocessor system employing energy power and energy management according to embodiments of the present invention. CPU 510 may also be operable to execute instructions implementing method steps according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for managing power utilization and performance of a multiprocessor (MP) system comprising the steps of:
   receiving first sensor data defining physical parameters of said MP system;
   receiving first parameters corresponding to customer level operational requirements of said MP system;
   determining power and performance goal settings for processors in said MP system in response to said first sensor data and said first parameters;
   generating a set of controls for said MP system in response to said power and performance goal settings; and
   applying said set of controls to adjust operation parameters of said processors in said MP system.

2. The method of claim 1, wherein said method further comprises the step of:
   applying said controls to adjust operation parameters of cooling systems for said MP system.

3. The method of claim 1, wherein said MP system comprises a single multiprocessor very large scale integrated circuit (VLSI) chip.

4. The method of claim 3, wherein said MP system comprises a cooling means for said multiprocessor VLSI chip.

5. The method of claim 4, wherein said cooling means comprises a single chip cooling fan.

6. The method of claim 4, wherein said cooling means comprises a controllable single chip thermo-electric cooler.

7. The method of claim 3, wherein said MP system comprises a self-contained MP system, said self-contained MP system comprising a plurality of said multiprocessor VLSI chips, said self-contained MP system further comprising a first controllable cooling system.

8. The method of claim 7, wherein said MP system comprises a rack MP system, said rack MP system comprising a plurality of said self-contained MP systems and a controllable rack cooling system.

9. The method of claim 8, wherein said MP system comprises a plurality of said rack MP systems, said MP system further comprising a controllable MP system cooling means.

10. The method of claim 1, wherein said first sensor data comprises temperatures of said processors in said MP system, supply voltages corresponding to circuits in said processors, clock frequencies of said processors, electromagnetic radiation (EMC) of said MP system, acoustic levels of said MP system, vibration levels of said MP system, and air temperatures of cooling systems in said MP system.

11. The method of claim 1, wherein said first parameters comprise customer level quality of service parameters for said MP system.

12. The method of claim 1, wherein said first parameters comprise policy of operation parameters for said MP system.

13. The method of claim 11, wherein said quality of service parameters comprise assignment data defining processor assignment to tasks performed by said MP system, access availability data for processors in said MP system, performance level data defining a performance for an application executing on processors of said MP system, and processor operational data defining which of said processors are operational.

14. The method of claim 12, wherein said policy of operation parameters comprise data defining a cost of power for said MP system, acceptable acoustic noise level data for said MP system, acceptable EMC output noise level data for said MP system, acceptable output vibration level data of said MP system and acceptable temperature level data for elements of said MP system.

15. The method of claim 1, wherein said power and performance goals comprise data defining a desired MP system power consumption level, data defining a desired processor power consumption level, data defining desired MP system temperatures, desired MP acoustic noise output levels, desired EMC noise levels, and desired processor instruction execution speeds.

16. The method of claim 1, wherein said set of controls comprise power supply voltage settings for said processors, clock frequency settings for said processors, cooling fan speeds, controls for said MP system cooling means and operational mode settings for said processors.

17. The method of claim 16, wherein said operational mode settings comprise an active mode and a sleep low power mode.

18. The method of claim 16, wherein said MP system cooling means comprises channeled temperature conditioned air.

19. A controller for managing power and performance in a multiprocessor MP system comprising:
   a first receiving circuit operable to receive first sensor data corresponding to physical parameters of said MP system;
   a second receiving circuit operable to receive first parameters defining customer level quality of service operational requirements of said MP system;
   a third circuit operable to determine power and performance goal settings for said processors in said MP system in response to said first data and said first parameters;
   a fourth circuit operable to generate a set of controls for said MP system in response to said power and performance goal settings; and
   a fifth circuit operable to apply said set of controls to adjust operation parameters of said processors in said MP system.

20. The controller of claim 19, wherein said fifth circuit is further operable to apply said set of controls to adjust operation parameters of cooling systems of said MP system.

21. The controller of claim 19, wherein said set of controls comprise power supply voltage settings for said processors, clock frequency settings for said processors, cooling fan speeds, controls for said MP system cooling means and operational mode settings for said processors.

22. The controller of claim 21, wherein said operational mode settings comprise an active mode and a sleep low power mode.

23. The controller of claim 21, wherein said MP system cooling means comprises channeled temperature conditioned air, chilled fluid and solid state cooling units.

24. A multiprocessor (MP) system comprising a plurality of processors and a controller for managing power and performance in said MP system, said controller further comprising:
   circuitry for receiving first sensor data defining physical parameters of said MP system;
   circuitry for receiving first parameters corresponding to customer level quality of service operational requirements of said MP system;

circuitry for determining power and performance goal settings for processors in said MP system in response to said first sensor data and said first parameters;

circuitry for generating a set of controls for said MP system in response to said power and performance goal settings; and circuitry for applying said set of controls to adjust operation parameters of said processors in said MP system.

25. The MP system of claim 24, wherein said controller is one of said plurality of processors in said MP system.

26. The MP system of claim 24, further comprising:

circuitry for applying said controls to adjust operation parameters of cooling systems for said MP system.

27. The MP system of claim 24, wherein said MP system comprises a single multiprocessor very large scale integrated circuit (VLSI) chip.

28. The MP system of claim 27, wherein said MP system comprises a cooling means for said multiprocessor VLSI chip.

29. The MP system of claim 28, wherein said cooling means comprises a single chip cooling fan.

30. The MP system of claim 27, wherein said MP system comprises a self-contained MP system, said self-contained MP system comprising a plurality of said multiprocessor VLSI chips, said self-contained MP system further comprising a first controllable cooling system.

31. The MP system of claim 30, wherein said MP system comprises a rack MP system, said rack MP system comprising a plurality of said self-contained MP systems and a controllable rack cooling system.

32. The MP system of claim 31, wherein said MP system comprises a plurality of said rack MP systems, said MP system further comprising a controllable MP system cooling means.

33. The MP system of claim 24, wherein said first parameters comprise policy of operation parameters for said MP system.

* * * * *